235-400
OR 2,580,862
SEARCH ROOM

Jan. 1, 1952 L. E. TOPHAM 2,580,862

COMPUTING DEVICE HAVING COMPOUND DRIVE RATE MULTIPLIER

Filed Feb. 18, 1946 4 Sheets-Sheet 1

Inventor
Laurence E Topham
By his Attorney

Jan. 1, 1952

L. E. TOPHAM

COMPUTING DEVICE HAVING COMPOUND DRIVE RATE MULTIPLIER 2,580,862

Filed Feb. 18, 1946

4 Sheets-Sheet 2

Inventor

Laurence E. Topham

By his Attorney

SEARCH ROOM

Inventor
Laurence E Topham
By his Attorney
[signature]

Inventor
Laurence E. Topham
By his Attorney

Patented Jan. 1, 1952 2,580,862

UNITED STATES PATENT OFFICE 2,580,862

COMPUTING DEVICE HAVING COMPOUND DRIVE RATE MULTIPLIER

Laurence E. Topham, Wenham, Mass., assignor to United Shoe Machinery Corporation, Flemington, N. J., a corporation of New Jersey Application February 18, 1946, Serial No. 648,478

12 Claims. (Cl. 235—61.5)

This invention relates to computing devices and particularly to improvements in mechanism for combining rate values with time values such, for example, as are embodied in ordnance data computing apparatus of the type illustrated in United States Letters Patent No. 2,340,865, issued February 8, 1944, on an application filed in the name of E. W. Chafee et al.

In this prior form of computing apparatus, as illustrated in the above patent (see Fig. 2), rate values are combined with time values, i. e., time of flight values, in a multiplier comprising a ball, disc and cylinder variable speed drive in which the disc is driven at a rate that is inversely proportional to the time value. For thus driving the disc of the multiplier a second ball, disc and cylinder variable speed drive is provided, the disc of this variable speed drive being driven at a constant speed and its ball carriage displaced proportionally to a reciprocal function of the time value by means of a three-dimensional cam, which is rotated in accordance with target range and translated in accordance with target altitude. The lift of this cam is made proportional to a reciprocal function of the time value so that the cylinder of this second variable speed drive rotates the disc of the multiplier at a rate which is inversely proportional to the time value.

With an arrangement of the above type, the slope of the three-dimensional cam becomes very steep and the resulting high cam angles impose a severe frictional load on the follower which is detrimental to satisfactory operation and, moreover, greatly restricts the values of time which may be placed on the cam. Also, due to the reciprocal character of the cam and the direct action of the variable speed drive, the ball carriage of the second variable speed drive will be positioned closer to the center of its cooperating disc when the target distance is greater, i. e., when the reciprocal function of the time of flight is smaller, with a resulting loss of torque and power for making the larger predictions.

It is an object of this invention to provide a novel computing apparatus of the type mentioned above by means of which the aforementioned disadvantages are avoided and other improved operating results obtained. To this end, the herein illustrated computing apparatus, which has a multiplier having a member to be moved at a rate that is inversely proportional to a time value, is provided with improved means for so driving the member including a novel variable speed drive mechanism having a displaceable speed-varying means and means for displacing said speed-varying means in accordance with a direct function of the time value. More particularly and in accordance with a feature of the invention, the means for driving the disc of the multiplier comprises, a variable speed drive having a pair of discs, mounted for rotation together about a common axis and operatively connected to said multiplier disc, a pair of rotary members driven at constant speeds, and friction means including balls, mounted in carriages, for driving the discs from said rotary members at a rate that is inversely proportional to the displacement of said friction means, together with cam means for displacing the friction means relatively to the common axis of said discs in accordance with a direct function of the time value.

With the novel arrangement outlined above, the lift of the cam means, which, as in the prior apparatus, may be rotatable and translatable, is proportional to a direct function of the time value, i. e., time of flight, and the steep angles of a reciprocal cam are avoided. In one form of the invention the rotary members consist of cylinders and the means for driving the disc of the multiplier is then responsive to a cam having a lift that is proportional to a direct and linear function of the time of flight. However, with the view of still further improving the cam angles, the driving means may, in accordance with a modified form, be adapted to respond to a cam having a lift that is proportional to a direct but non-linear function of the time value by making the rotated members thereof conical in shape. In either instance, however, the resulting cam shapes are much easier to produce and are capable of accommodating a greater number of time values.

Moreover, with the improved drive means of this invention, the speed-varying friction means will be near the edges of the discs for distant targets, thereby giving increased torque and power and correspondingly greater accuracy. The discs of the novel variable speed drive mechanism are balanced axially thus avoiding side thrust on their supporting bearings and decreasing friction while the use of two rotary members for driving the discs still further augments the power output.

The above and further objects and features of this invention will be apparent from the following detailed description of the embodiments thereof illustrated in the accompanying drawings and will be pointed out in the claims.

Figures 1, 2, 3:
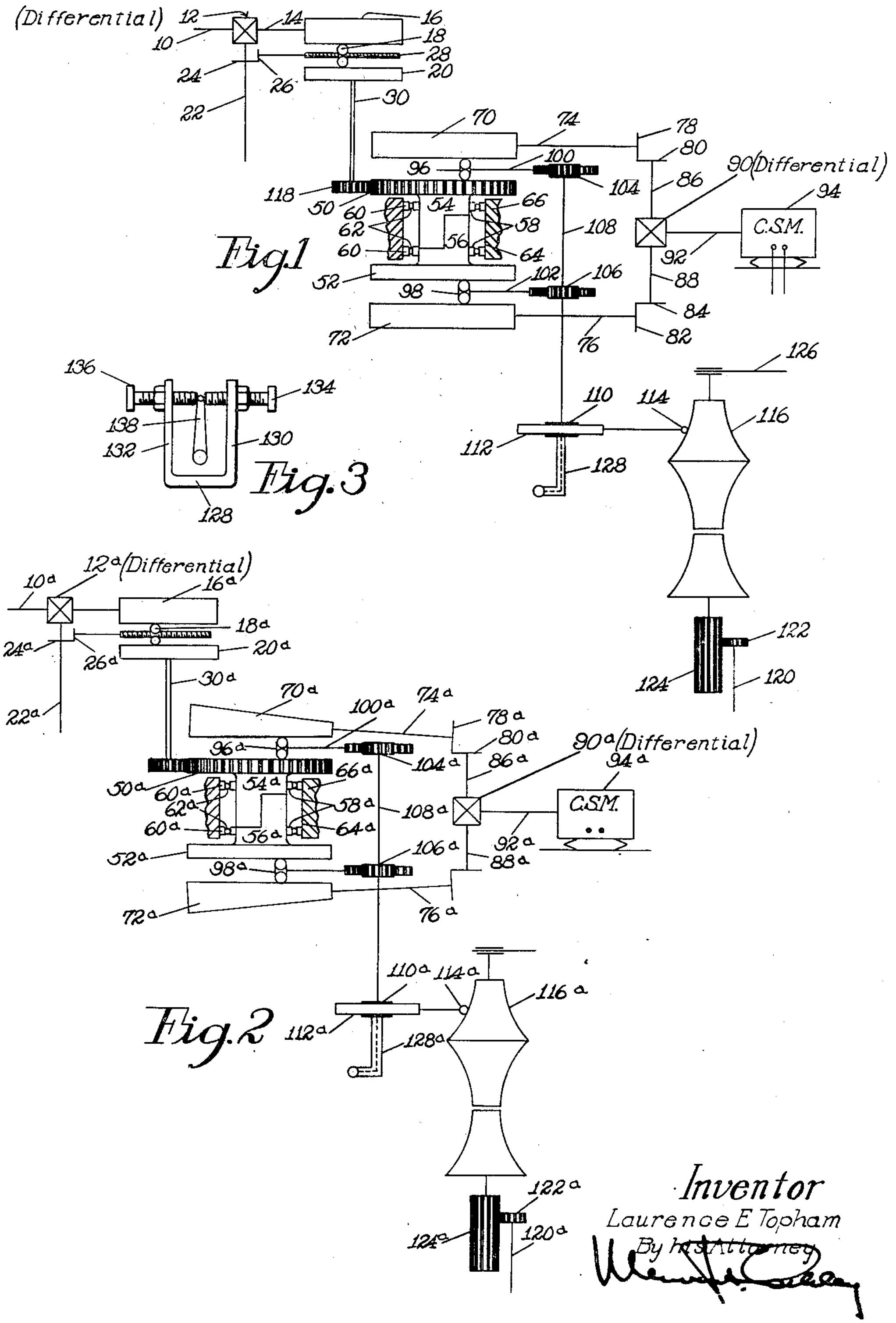
Fig. 1 is a schematic drawing of apparatus embodying features of the invention.
Fig. 2 is a similar drawing, but showing a modified arrangement.
Fig. 3 is a detailed view of a mechanism common to both Figs. 1 and 2.

Referring to Figs. 1 and 2, the constructions shown in these figures are in general the same and comprise a multiplier of the type disclosed in the patent above mentioned and having a shaft 10, that is driven by mechanism not shown in accordance with a rate value, which shaft drives one arm of a differential 12, a second arm of which is connected by a shaft 14 to a cylinder 16 which is driven, through balls 18, from a disc 20. The third arm of the differential 12 drives a shaft 22, the rotations of which are transmitted, by means of bevel gears 24 and 26 to a threaded adjusting shaft 28 for positioning the balls 18 radially of the disc 20. This disc is driven by a shaft 30 and, as will be understood by reference to the patent mentioned above, the arrangement is such that when the shaft 10 is rotated in accordance with a rate value, i. e., a component target rate, and the disc 20 rotated in accordance with a reciprocal function of the time value, i. e., time of flight, the radial position of the balls 18, after equilibrium has been established by the differential 12, will represent the product of the component target rate multiplied by the time value, i. e., the predicted target movement; the disc 20, cylinder 16 and differential 12 of the illustrated construction corresponding, respectively, to the disc 79, cylinder 76 and differential 75 of the construction shown in the prior patented construction; and this product will appear as a rotation of the shaft 22.

In the prior patented construction, as has already been mentioned, the disc of the multiplier is rotated at a rate that is inversely proportional to the time value by means of a variable speed drive having a speed varying element which is positioned by means of a three-dimensional cam, having a lift that is proportional to a reciprocal function of time of flight, see cam T, Figures 1B and 2 of that patent, and this cam is rotated in accordance with target range and translated in accordance with target altitude. For avoiding the difficulties and disadvantages encountered in the use of a reciprocal cam of this type, already referred to above, the mechanism of the present invention comprises novel means for driving shaft 30 and the disc 20 of the multiplier at a rate that is inversely proportional to a function of a time value, such, for example, as time of flight, and which includes a three-dimensional cam, rotated in accordance with target range and translated in accordance with target altitude, having a lift that is proportional to a direct function of the time value.

Referring now particularly to Fig. 1, the improved driving mechanism therein shown comprises a pair of discs 50 and 52, having telescoped and mating hub sections 54 and 56 that are journaled in radial anti-friction bearings, each having inner and outer races 58 and 60 and anti-friction balls 62. The outer races of these bearings are mounted with freedom of axial movement in a bore 64 formed in a supporting member 66. Mounted adjacent to these discs are a pair of cylinders 70 and 72 which are operatively connected by shafts 74 and 76, gears 78, 80, 82 and 84, shafts 86 and 88 and a differential 90 to the shaft 92 of a constant speed motor 94. The discs 50 and 52 are driven from the cylinders 70 and 72 by means of balls 96 and 98 that are adjustable radially across the discs by means of rack bars 100 and 102, pinions 104 and 106, shaft 108, pinion 110, rack bar 112, cam follower 114 and cam 116. One of the discs 50 is provided with a toothed periphery that meshes with a gear 118 on the shaft 30.

As will be apparent, with the motor 94 running at a constant speed, the speed of the discs 50 and 52 and hence that of shaft 30 and disc 20, will be inversely proportional to the distance the balls 96 and 98 are displaced from the centers of their cooperating discs 50 and 52. Thus, if the lift of the cam 116, which is arranged to be rotated in accordance with target range by means of a shaft 120 and gears 122 and 124 and translated in accordance with target altitude by means of a bracket 126, is made proportional to a direct function of the time value, i. e., time of flight, the speed of the discs 50 and 52 will be inversely proportional to the time of flight value and shaft 30, together with the disc 20 of the multiplier, will be rotated at a rate that is inversely proportional to the time of flight value as required.

Shaft 108 is connected to the pinion 110 by means of a yoke 128 having arms 130 and 132 in which are mounted threaded adjusting screws 134 and 136 that bear against the opposite sides of the end of an arm 138 formed integrally with the shaft 110 (see Fig. 3). This arrangement makes it possible to effect calibration adjustments of the position of the balls 96 and 98.

In the form of the invention just described, the speed of rotation of the discs 50 and 52, as well as of the multiplier disc 20, which is connected thereto by the shaft 30, will be inversely proportional to a linear function of the lift of the cam 116 inasmuch as the cylinders 70 and 72 are of uniform diameter throughout their entire length. Thus, the cam 116 may be shaped so that its lift at any point is a direct linear function of the time of flight value for the corresponding values of target range and altitude at that particular point. The shape of such a cam is much better than that of a cam whose lift is inversely proportional to the time of flight value since the slopes are less steep and the cam angles correspondingly reduced.

However, I have found that the cam shape may be still further improved by making its lift directly proportional to a non-linear function of the time of flight value. To accommodate such a cam, the improved drive mechanism is modified to make the speed of the discs proportional to a non-linear function of the displacement of the balls so that these discs will be rotated at a speed which is inversely proportional to the time of flight value as required, and a modified construction of this type is shown in Fig. 2 of the drawings.

Referring to this figure, the construction there-

SEARCH ROOM in illustrated is with one exception the same as that of Fig. 1 and accordingly similar reference characters followed by the letter *a* have been used to designate corresponding parts. However, in place of the cylinders 70 and 72 the discs 50*a* and 52*a* are now driven from conical members 70*a* and 72*a*. As will be readily apparent, the speed of the discs 50*a* and 52*a* in this modified arrangement will still be inversely proportional to the distance the balls 96 and 98 are displaced from their centers, but their speed is no longer a linear function of this displacement. Consequently the lift of the cam 116*a*, while still directly proportional to the time of flight value, is modified so as to shift the balls 96 and 98 in accordance with a non-linear function thereof. By suitably selecting the angles of the conical members 70*a* and 72*a* and correspondingly proportioning the lift of the cam 116*a*, the discs 50*a* and 52*a* will be driven at a speed which is inversely proportional to the time of flight value as is desired.

In Figs. 1 and 2 the shapes of cams 116 and 116*a* are of course schematically represented and no attempt has been made to show the exact shape of these cams.

Figures 4, 5:
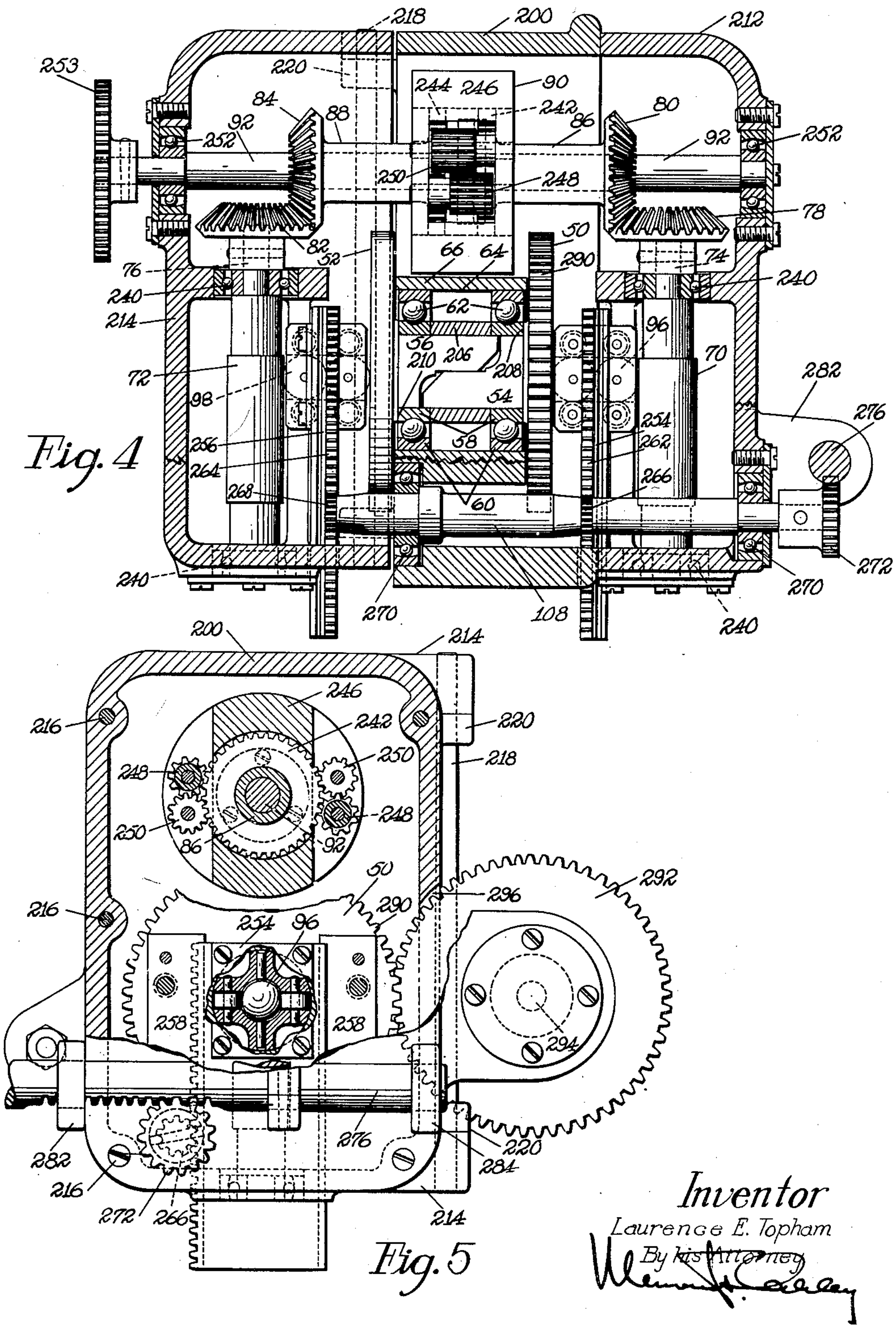
Fig. 4 is a view in front elevation, with certain parts in section, of the variable speed drive mechanism shown in Fig. 1.
Fig. 5 is a view of the right hand of the mechanism shown in Fig. 4 with certain parts broken away and others shown in section.
Figure 6:
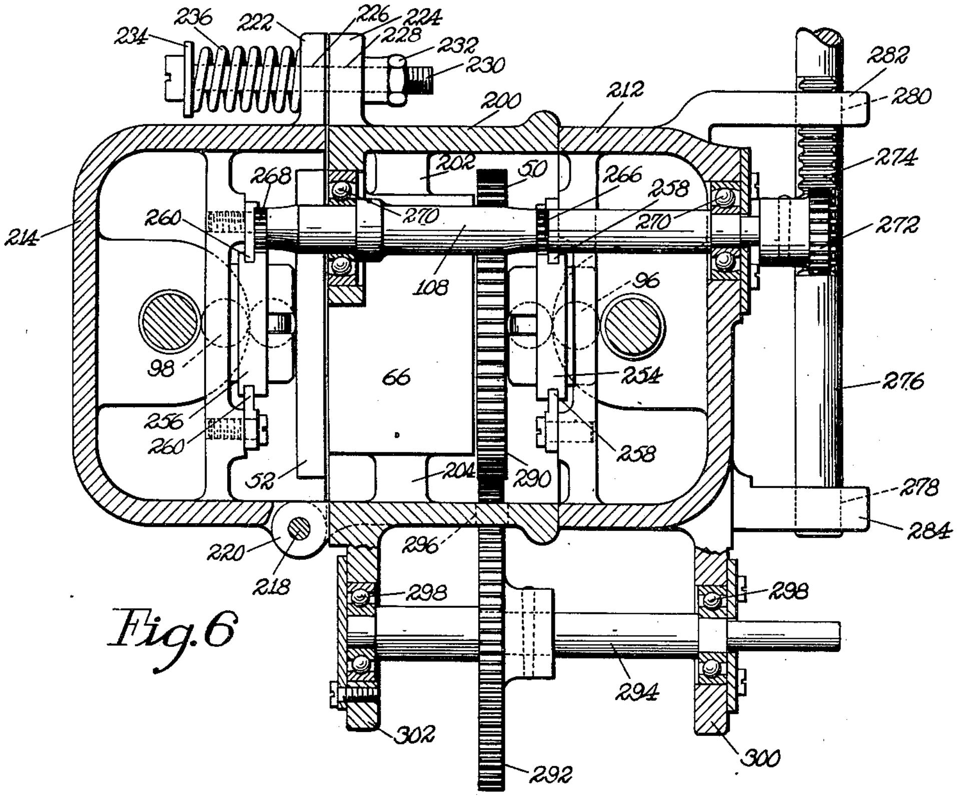
Fig. 6 is a bottom view of the mechanism shown in Fig. 4 with certain portions shown in section.

Referring now to Figs. 4, 5 and 6, a preferred construction of driving means embodied in the apparatus which is schematically illustrated in Fig. 1, is shown. The outer races 60 of the anti-friction bearings which supported the discs 50 and 52 are mounted with freedom of axial movement in the bore 64 of the supporting member 66 which is connected to an open-ended housing member 200 by webs 202 and 204, see Fig. 6. The telescoped hub sections 54 and 56 of the discs 50 and 52 are bound together by a spacing collar 206 which also separates the inner races 58 of the anti-friction bearings and holds them against shoulders 208 and 210 formed on the discs 50 and 52 respectively, see Fig. 4. The open ends of the housing 200 are closed by hollow covers 212 and 214, see Fig. 6, the former being rigidly secured to the housing 200 by means of screws 216, see Fig. 5, while the latter is pivoted thereto on a rod 218 that passes through ears 220 on the housing. The cover 214 is provided with an ear 222 that is in alinement with an ear 224 on the housing 200, see Fig. 6, and passing through bores 226 and 228 in these ears is a clamping bolt 230 having adjustable thrust nut 232 threaded on one end and provided with a thrust washer 234 at its opposite end. A compression spring 236 surrounds the bolt 228 and bears against the washer 234 and the ear 222 thus to urge the cover yieldingly to closed position.

The cylinders 70 and 72 are journaled in anti-friction bearings 240, mounted in the covers 212 and 214, respectively, see Fig. 4, while their shafts 74 and 76 have pinned to them the gears 78 and 82 which mesh with the gears 80 and 84 that are formed integrally with the shafts 86 and 88 which are of hollow construction. These shafts are each secured to one of the side gears 242 and 244 of the differential 90 which has a carrier 246 and pinions 248 and 250, see Fig. 5. The shaft 92, which is journaled in self-alining anti-friction bearings 252 mounted in the covers 212 and 214, passes through the hollow shafts 86 and 88 and is connected to the carrier of the differential 90. This shaft also extends out through the cover 214 where it is provided with a gear 253 which is adapted to be driven by means of a constant speed motor not shown but corresponding to the motor 94 in the apparatus shown in Fig. 1.

The balls 96 and 98 are mounted in carriers 254 and 256 which are slidable along guides 258 and 260, secured to portions of the covers 212 and 214 respectively, see Fig. 6. These carriers have rack teeth 262 and 264 which mesh with pinion teeth cut on a shaft 108 which is journaled in antifriction bearings 270, 270, one of which is mounted in the cover 212 and the other in the housing 200. The shaft 108 extends beyond the cover 212 and carries a pinion 272 which meshes with rack teeth 274 cut on a rod 276 that is slidably mounted in bearing bores 278 and 280 provided in ears 282 and 284 that extend outwardly from the cover 212. This rod is adapted to be operated by the follower of a cam corresponding to the cam 116 of the apparatus shown schematically in Fig. 1 and its movement adjusts the positions of the balls 96 and 98 relatively to the centers of their cooperating discs 50 and 52 for the purposes already explained.

The disc 50 has a toothed periphery 290 which meshes with a gear 292 pinned to a shaft 294, this gear extending into the housing 200 through an opening 296 (see Fig. 5). The shaft 294, which is adapted to be connected to the shaft 30 of the apparatus shown in Fig. 1, is journaled in anti-friction bearings 298 carried in ears 300 and 302 extending from the cover 212 and housing 200, respectively.

Figure 7:
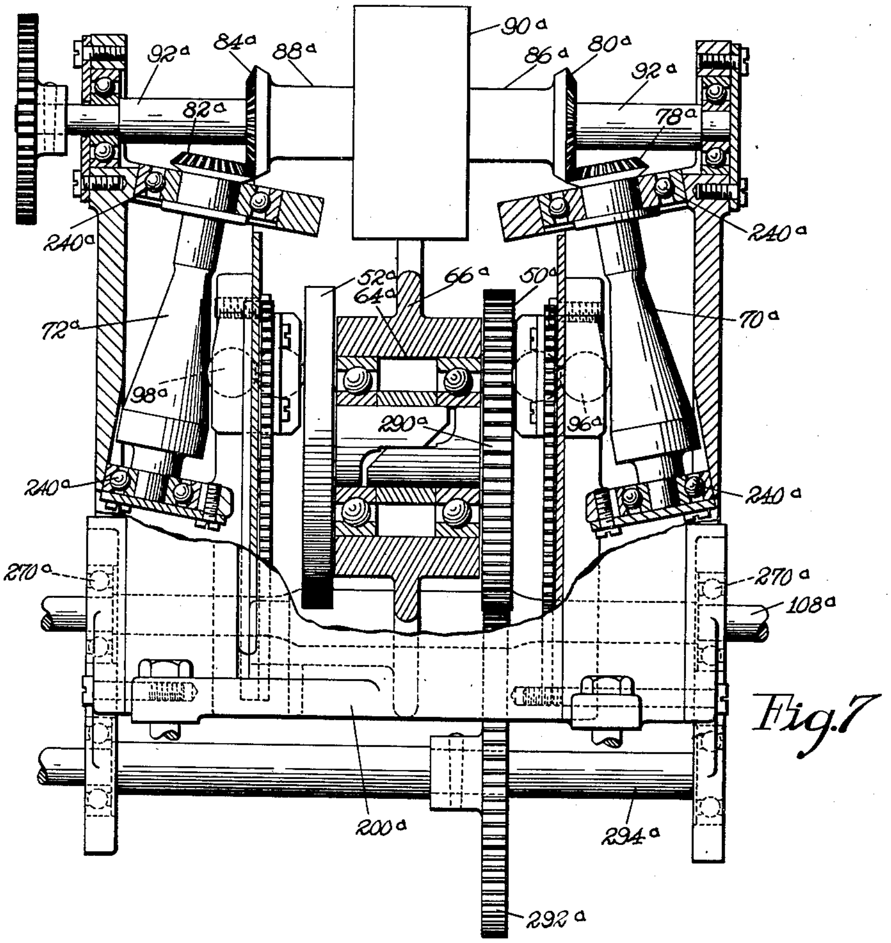
Figs. 7 and 8 are views corresponding to Figs. 4 and 6 but showing the modified drive mechanism of the apparatus illustrated in Fig. 2.
Figure 8:
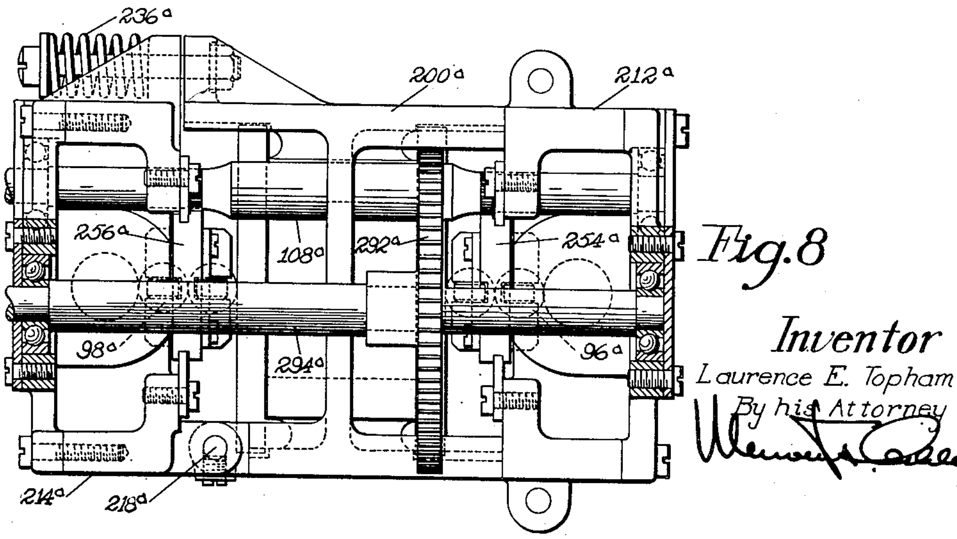

Referring now to Figs. 7 and 8, a modified construction corresponding to the mechanism shown schematically in Fig. 2 is therein illustrated. This construction, which is essentially the same as that just described in detail above, comprises a housing 200*a* having end covers 212*a* and 214*a*, the latter of which is pivoted on a rod 218*a* and urged yieldingly toward closed position by a compression spring 236*a*. The discs 50*a* and 52*a* are rotatably mounted on anti-friction bearings supported with freedom of axial movement in a bore 64*a* formed in a member 66*a* which is integral with the housing 200*a*. The conical rollers 70*a* and 72*a* are mounted in bearings 240*a* which are carried in angularly disposed supports so as to position each of these rollers with one side thereof parallel to the operating face of its cooperating disc 50*a* or 52*a*. These conical rollers are driven from the differential 90*a* through shafts 86*a*, 88*a*, gears 78*a*, 80*a*, 82*a*, and 84*a*, and the carrier of the differential 90*a* is driven by the shaft 92*a*, the arrangement being similar to that in the construction described in detail above. The disc 50*a* has a toothed periphery 290*a* which meshes with a gear 292*a* pinned to a shaft 294*a* and the balls 96*a* and 98*a* are mounted in carriers 254*a* and 256*a* which are adjusted by means of a shaft 108*a* rotatably mounted in bearings 270*a*.

In each of the improved drive mechanisms just described the output discs 50, 52 and 50*a*, 52*a* are mounted on anti-friction bearings of relatively small diameter, compared to the diameters of their cooperating discs, and because of the manner of mounting these bearings with freedom of axial movement they are not subjected to any axial thrust. The balls 96, 98 and 96*a*, 98*a* are held against their cooperating discs and cylinders with a yielding pressure imposed by the springs 236, 236*a*. Any slight differences in the displacements of the balls 96, 98 or 96*a*, 98*a* will be compensated for by the differentials 90, 90*a*, as will be readily understood. By using two sets of discs, balls and driving cylinders, or conical members, the power output of the drive mechanism is doubled and creepage under load is minimized. The symmetrical arrangement of the balls eliminates any tendency of the discs to tip and thus impose a cramping load on the anti-friction bearings. While particularly adapted for use in computing apparatus of the type herein illustrated, my improved drive mechanisms are capable of use in other types of computing apparatus, as well as separately and in other types of mechanism as variable speed drives.

Having described my invention, what I claim as new and desire to secure by Letters Patent of the United States is:

1. In a computing apparatus, the combination with mechanism for combining a rate value with a time value having a member to be moved at a rate that is inversely proportional to said time value, of means for so moving said member comprising a pair of discs mounted for rotation together about a common axis and operatively connected to said member, a pair of rotary members, means including a differential for driving said rotary members at constant speeds, balls for driving said discs from said rotary members, and means for displacing said balls relatively to the common axis of said discs in accordance with a direct function of said time value, said last-named means including a rotatable and axially displaceable cam.

2. In a computing apparatus, the combination with prediction mechanism for combining a rate value with a time of flight value having a member to be moved at a rate that is inversely proportional to said time of flight value, of means for so moving said member comprising a pair of discs mounted for rotation together about a common axis and operatively connected to said member, a pair of rotary members, means including a differential for driving said rotary members at constant speeds, balls for driving said discs from said rotary members, and means for displacing said balls relatively to the common axis of said discs in accordance with a direct function of said time of flight value, said last-named means including a rotatable and axially displaceable cam.

3. In a computing apparatus, the combination with mechanism for combining a rate value with a time value having a member to be moved at a rate that is inversely proportional to said time value, of means for moving said member comprising a pair of discs mounted for rotation together about a common axis and operatively connected to said member, a pair of cylinders, means including a differential for rotating said cylinders at constant speeds, balls for driving said discs from said cylinders, and means for displacing said balls relatively to the common axis of said discs in accordance with a direct function of said time value, said last-named means including a rotatable and axially displaceable cam.

4. In a computing apparatus, the combination with prediction mechanism for combining a rate value with a time of flight value having a member to be moved at a rate that is inversely proportional to said time of flight value, of means for so moving said member comprising a pair of discs mounted for rotation together about a common axis and operatively connected to said member, a pair of cylinders, means including a differential for rotating said cylinders at constant speeds, balls for driving said discs from said cylinders, and means for displacing said balls relatively to the common axis of said discs in accordance with a direct function of said time of flight value, said last-named means including a rotatable and axially displaceable cam.

5. In a computing apparatus, the combination with mechanism for combining a rate value with a time value having a member to be moved at a rate that is proportional to said time value, of means for so moving said member comprising a pair of discs mounted for rotation about a common axis and operatively connected to said member, a pair of conical members, means including a differential for rotating said conical members at constant speeds, balls for driving said discs from said conical members, and means for displacing said balls relatively to the common axis of said discs in accordance with a direct non-linear function of said time value, said last-named means including a rotatable and axially displaceable cam.

6. In a computing apparatus, the combination with prediction mechanism for combining a rate value with a time of flight value having a member to be moved at a rate that is proportional to said time of flight value, of means for so moving said member comprising a pair of discs mounted for rotation about a common axis and operatively connected to said member, a pair of conical members, means including a differential for rotating said conical members at a constant speed, balls for driving said discs from said conical members, and means for displacing said balls relatively to the common axis of said discs in accordance with a direct non-linear function of said time of flight value, said last-named means including a rotatable and axially displaceable cam.

7. A drive mechanism comprising a pair of discs mounted for rotation together about a common axis and having freedom of axial movement, a pair of rotary members, means for driving said members, balls interposed between said discs and said rotary members, and means for displacing said balls relatively to the common axis of said discs, one of said rotary members being mounted for rotation about a fixed axis and the other being yieldably urged toward said discs to hold said balls in frictional engagement with said discs and said rotary members.

8. A drive mechanism comprising a pair of discs mounted for rotation together about a common axis and having freedom of axial movement, a pair of cylindrical members, means for driving said members, balls interposed between said discs and said cylindrical members, and means for displacing said balls relatively to the common axis of said discs, one of said cylindrical members being mounted for rotation about a fixed axis and the other being yieldably urged toward said discs to hold said balls in frictional engagement with said discs and said cylindrical members.

9. A drive mechanism comprising a pair of discs mounted for rotation together about a common axis and having freedom of axial movement, a pair of conical members, means for driving said conical members, balls interposed between said discs and said conical members, and means for displacing said balls relatively to the common axis of said discs, one of said conical members being mounted for rotation about a fixed axis and the other being yieldably urged toward said discs to hold said balls in frictional engagement with said discs and said conical members.

10. A drive mechanism comprising a pair of discs mounted for rotation about a common axis

SEARCH ROOM and having freedom of axial movement, a pair of rotary members, means including a differential for driving said members, balls interposed between said discs and said rotary members, and means for displacing said balls relatively to the common axis of said discs, one of said rotary members being mounted for rotation about a fixed axis and the other being yieldably urged toward said discs to hold said balls in frictional engagement with said discs and said rotary members.

11. A drive mechanism comprising a pair of discs mounted for rotation together about a common axis and having freedom of axial movement, a pair of cylindrical members, means including a differential for driving said members, balls interposed between said discs and said cylindrical members, and means for displacing said balls relatively to the common axis of said discs, one of said cylindrical members being mounted for rotation about a fixed axis and the other being yieldably urged toward said discs to hold said balls in frictional engagement with said discs and said cylindrical members.

12. A drive mechanism comprising a pair of discs mounted for rotation together about a common axis and having freedom of axial movement, a pair of conical members, means including a differential for driving said conical members, balls interposed between said discs and said conical members, and means for displacing said balls relatively to the common axis of said discs, one of said conical members being mounted for rotation about a fixed axis and the other being yieldably urged toward said balls in frictional engagement with said discs and said conical members.

LAURENCE E. TOPHAM.

REFERENCES CITED

The following references are of record in the file of this patent:

UNITED STATES PATENTS

| Number | Name | Date |
|---|---|---|
| 1,229,879 | Buffat | June 12, 1917 |
| 1,387,551 | Meitner | Aug. 16, 1921 |
| 1,831,595 | Gray | Nov. 10, 1931 |
| 2,164,516 | Gotz | July 4, 1939 |
| 2,206,875 | Chafee | July 9, 1940 |
| 2,340,865 | Chafee | Feb. 8, 1944 |
| 2,357,035 | Treese et al. | Aug. 29, 1944 |
| 2,366,658 | Suoboda | Jan. 2, 1945 |
| 2,377,898 | Myers | June 12, 1945 |
| 2,388,680 | Dawson | Nov. 13, 1945 |
| 2,433,006 | Weiss | Dec. 23, 1947 |

FOREIGN PATENTS

| Number | Country | Date |
|---|---|---|
| 630,318 | Germany | May 25, 1936 |